United States Patent [19]

Mengoli et al.

[11] 4,231,851

[45] Nov. 4, 1980

[54] METHOD FOR ELECTROCHEMICALLY COATING A METALLIC SUBSTRATE WITH A PROTECTIVE FILM OF A PHENOLIC RESIN

[75] Inventors: Giuliano Mengoli, Padua; Sergio Daolio, Luzzara; Ugo Giulio, Testona; Carlo Folonari, Turin, all of Italy

[73] Assignees: Centro Ricerche Fiat S.p.A., Orbassano; Consiglio Nazionale Delle Ricerche, Rome, both of Italy

[21] Appl. No.: 27,700

[22] Filed: Apr. 6, 1979

[30] Foreign Application Priority Data

Apr. 10, 1978 [IT] Italy ............................. 67788 A/78

[51] Int. Cl.³ .................... C25D 9/02; C25D 13/08
[52] U.S. Cl. ............................. 204/181 R; 204/14 N
[58] Field of Search ..................... 204/14 N, 181 R

[56] References Cited

U.S. PATENT DOCUMENTS

| 3,335,075 | 8/1967 | Borman | 204/181 R |
| 3,655,543 | 4/1972 | Dijkstra et al. | 204/181 R |

Primary Examiner—Howard S. Williams
Attorney, Agent, or Firm—Sughrue, Rothwell, Mion, Zinn and Macpeak

[57] ABSTRACT

Adherent insoluble coating film of a phenolic resin is obtained by electrolysis of an alkaline-reacting aqueous electrolyte comprising phenol, a mono- or di-substituted phenol with substituent(s) in o- or m-position, and an alkylene diamine, in specific proportions. The current density shall never exceed 10 mA/sq.cm. The voltage is from 2.5 V to 10 V and is preferably kept constant. Coating thickness values exceeding 1 micron and up to about 25–30 microns are obtainable within a short time at the expense of 2–2.5 Faradays per mole deposited phenol. The substituted phenol is preferably o-chloro-phenol, and the diamine is preferably ethylenediamine.

9 Claims, 1 Drawing Figure

U.S. Patent     Nov. 4, 1980     4,231,851
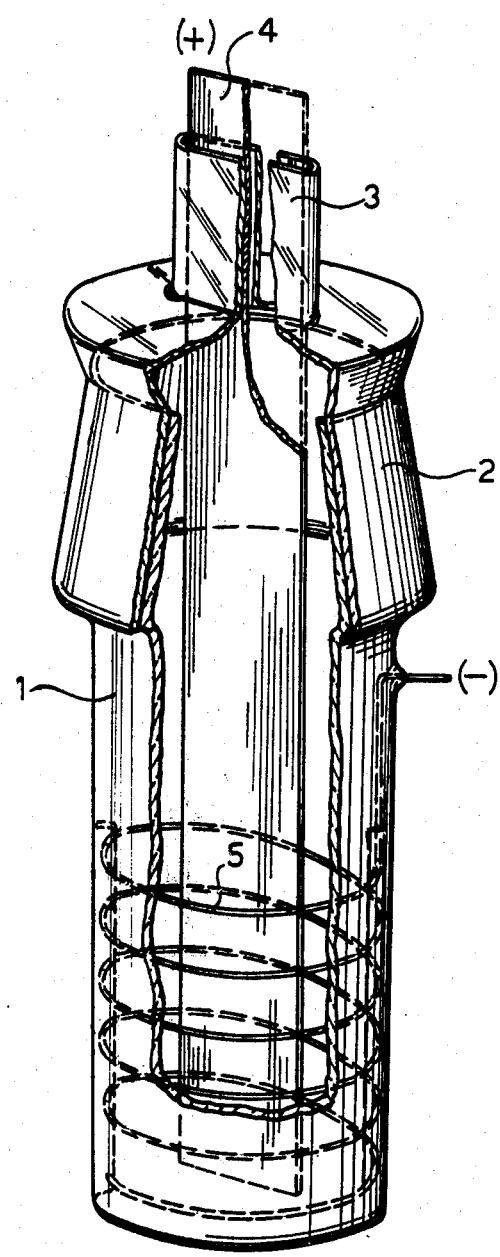

METHOD FOR ELECTROCHEMICALLY COATING A METALLIC SUBSTRATE WITH A PROTECTIVE FILM OF A PHENOLIC RESIN

This invention relates to a method for electrochemically coating a metallic substrate utilized as anode in an electrochemical cell in which a direct current flow of electrical energy is passed from a cathode to said anode through a liquid alkaline-reacting electrolyte comprising at least one phenolic monomer and a basic substance dissolved in a liquid solvent, thereby to progressively form on said substrate and impervious adherent polymeric film of a phenolic resin.

It is known that phenol monomers (including phenol and variously substituted phenols) may be electrolytically polymerized in the body of an electrolyte to produce polyoxyphenylene resins. Much information on this technique is contained in U.S Pat. No. 3,335,075 in the name of William F. H. Borman, disclosing both emuslion-polymerization and solution-polymerization possibilities. One of the essential aspects of Borman's disclosed process resides in the use of a cell comprising an anolyte compartment and a catholyte compartment, wherein the anolyte contains a catalytic complex formed by a copper salt and a complexing agent consisting of a primary, secondary or tertiary amine or ammonia. The use of amines such as N,N,N',N'-tetramethyl-1,3-butane-diamine, triethanolamine, methylpropylamine and dimethylamine is specifically exemplified and leads to formation of a polyoxyphenylene polymer dispersed or dissolved in the anolyte. In Example 1, the solvent in the anolyte is methanol to provide solution-polymerization conditions; in Examples 2 and 6, referring to emulsion-polymerization conditions, the anolyte contains water.

An old attempt of forming a protective film of a phenolic resin directly on a metallic anode by electrolytic polymerization is disclosed by U.S. Pat. No. 2,961,384, suggesting a non-aqueous electrolyte comprising molten phenol and small amounts metal hydroxides. The main drawbacks of this process reside in that the electrolyte is toxic, its electric resistivity under electrolysis conditions is high, and the efficiency is poor in that at least 50 up to 70 Faradays are consumed per each mole polymerized phenol. A further drawback is the necessity of operating at elevated temperatures.

British Pat. No. 1,156,309 discloses coating anodically-connected metallic substrates with polyarylene oxide films by electrolysis of aqueous solutions of phenol at least partly salified with sodium hydroxide. However, the obtained coatings are of a spongy appearance and have poor mechanical and dielectric properties. Also the throwing power of the electrolyte is low, with the result that polymerization mainly occurs on anode surfaces turned towards the cathode and is practically insignificant on surface portions which are "in shadow" with respect to the cathode. Yet, a high throwing power is necessary in connection with spatially complicate structures, such as automobile bodies and frames, wherein a uniformly thick protective coating is required on all surface portions.

French Patent Application No. 77.17851 discloses electrolytically coating metallic substrates with thin films of polyoxyphenylene polymers having reactive functional groups from an electrolyte containing phenol derivatives and alkali metal hydroxides in methanolic solution. The coating film is adherent to the substrate and hydrorepellent. However, a relatively quick passivation of the substrate (anode) occurs during the coating process, with the consequence that only extremely thin (about 0.1 micron) coating films are obtainable, insufficient to secure the necessary mechanical and anti-impact properties.

French Patent Specification No. 2,270,338 discloses an electrolytic coating process wherein the electrolyte comprises a lower alcohol (e.g. methanol), sodium hydroxide and a phenol substituted in the 2 and 6 positions by a halogen, lower alkyl, phenyl or methoxy group. However, the maximum obtainable thickness of the coating is about 0.1 micron only and relatively high voltages (up to 100V) are necessary.

It is an object of this invention to provide an electrochemical coating process by which impervious, adherent, insoluble coating films of a phenolic polymer of substantial thickness (at least 1 micron, and even of 30 microns) may easily be obtained in a simple electrolytic cell not comprising porous separators and the like. A particular object of the invention is to obtain said coating films from an aqueous electrolyte, while a further object of the invention is to provide a high-efficiency process wherein said coating films may be obtained at the cost of a few Faradays only, per mole deposited phenol monomer. Also, an important object of this invention is to provide process conditions requiring a safely low voltage (possibly less than 10V) applied to the electrodes. A still further object, in combination with the preceding objects, is to provide a process by which complicate structures such as automobile bodies and automobile frames may be coated in a substantially uniform manner in simple electrolytic cells comparable with cells commonly used to date in connection with electrophoretic coating of said bodies or frames. Still further objects and advantages will result evident from the following description.

In accordance with this invention, it was discovered that the objects stated above may be attained with the use of an alkaline-reacting electrolyte containing specific proportions of both phenol, a substituted phenol and an aliphatic diamine (alkylene diamine).

Accordingly, this invention provides a method for electrochemically coating a metallic substrate utilized as anode in an electrochemical cell in which a direct current flow of electrical energy is passed from a cathode to said anode through a liquid, alkaline-reacting electrolyte comprising at least one phenolic monomer and a basic substance dissolved in a normally liquid solvent, thereby to progressively form on said substrate an impervious adherent polymeric film of a phenolic resin, said method being characterized in that:

(a) the solvent is water, an alcohol, or a mixture of the two;

(b) the phenolic monomer content comprises phenol in an amount of from 50 to 250 g per liter electrolyte, and at least one halo-, alkyl- or alkoxy-substituted phenol in total amount of from 5 to 35 g per liter electrolyte, the substituent(s) being in orto- or meta position and not in para position;

(c) the basic substance comprises an alkylene diamine, optionally N,N'-disubstituted with hydroxyalkyl groups, in an amount of from 1 to 10 vol.% referred to the electrolyte:

(d) the direct current flow density does not exceed 10 MA per sq.cm. of the metallic substrate.

The alcohol is used to keep in dissolved condition the phenolic monomers when the proportion of the latter is relatively high (within the indicated ranges). The preferred alcohol is methanol. It is preferred to use a mixture of water and methanol, with water/methanol proportion of from 20:1 to 1:10 by volume; this mixture satisfactorily dissolves the phenolic monomers and at the same time favours precipitation of the polymer on the substrate to be coated. If convenient, other alcohols which are solvents to phenolic monomers may be used, such as ethanol, propanol, isopropanol or butanol.

The substituted phenol may be mono- or di-substituted and is preferably the o-chloro-phenol or the m-chloro-phenol. Acceptable results are also obtainable with o-methyl-phenol, o-methoxy-phenol, 2,6-dimethyl-phenol and 3,5-dimethyl-phenol.

The alkylene diamine is preferably ethylene-diamine or N,N'-bis(2-hydroxyethyl)-ethylene diamine. However, if convenient, other alkylene diamines may be used, such as propylene-diamine, trimethylene-diamine, diaminobutanes with amino-groups in 1,2-, 1,3-, 1,4- and 2,3-positions, 1,5- and 2,4-diamino pentanes, 2,5-diaminohexane or 1,8-diamino-octane. The preferred diamines are those wherein the N,N'-atoms are interconnected by a chain of two C-atoms.

The pH value of the electrolyte is that inherently resulting from the kind and concentration of the diamine; the typical pH value is about 10. As will be seen from the Examples hereinafter, an alkali metal hydroxide such as NaOH may be present, in the sense that the method according to this invention properly functions even in the presence of NaOH; however, this presence is absolutely superfluous in practice and the proportion NaOH (if present) should preferably not exceed about 10 g/liter.

It is to be expressly pointed out that no chemical catalyst shall be introduced into the electrolyte. This particularly applies to the copper salts cited in the aforementioned U.S. Patent to Borman. The only catalysis is that which takes place on the anodically-connected metallic substrate by the effect of the electric current flow. Any added catalysts would undesirably promote polymerization in the body of the electrolyte.

In industrial practice, the metal substrate will be (most frequently) of ferrous character, such as steel, alloyed steel, cast iron or wrought iron. However, the present method is successful also in connection with many other substrates, similarly to the method disclosed by the aforesaid British Patent No. 1,156,309, for example aluminum and its alloys, or zinc and its alloys. Also the cathode may be constructed in accordance with the prior art, for example of platinum or carbon, and, preferably, a non-compartmented cell is used.

The anodic current density shall not exceed about 10 mA/sq.cm. throughout the entire duration of the coating process, in particular since the very beginning of the process. The DC voltage applied to the electrodes is advantageously from about 2.5V to about 10V. Preferably, the voltage is selected in the above range and is maintained constant during the process. Under these conditions, as the coating thickness increases the current density decreases correspondingly without no abrupt drop even when the coating thickness reaches and exceeds 1 micron. It will be seen hereinafter that coating thicknesses as great as 25–30 microns are obtainable in this way within a reasonably short time. At the other hand, the progressive decrease of the current density during the process indicates that the electrolyte exhibits a satisfactory throwing power; in fact, practical experience shows that the latter is comparable with that of electrophoretic coating baths successfully used at present.

At the parity of other conditions, the effect of increasing voltage values in the range indicated above is acceleration of the coating process. However, an undue increase of the voltage within the side range may impair the efficiency of the process, in the sense that more Faradays are spent per mole deposited phenol. Also, if the anodic current density is selected close to 10 mA/sq.cm. and the voltage is close to the upper limit, passivation of the anode is accelerated with the result that a sudden current drop may occur when, for example, the thickness of the coating is only 15 micron, or so, and no further increase in thickness is possible.

In the absence of the substituted phenol is the electrolyte, compact adherent insoluble coatings are not obtainable. In case of o-chloro-phenol, the recommendable proportions with respect to phenol are from 1:10 to 2:10.

Increasing proportions of the diamine accelerate the passivation of the anode; thus, if relatively thick coatings are desired, the diamine proportion should be selected about in the middle of the range indicated hereinbefore. At the same concentration of diamine in the electrolyte, high concentrations of phenolic monomers lead to a relatively slow decrease of current density with time during the process; thus, unduly high concentrations of these monomers adversely influence the throwing power. Unduly low concentrations accelerate passivation.

"Cellosolve" is used in the present method for the purpose of improving the external aspect of the coating films.

As to the temperature, the best results are obtained in the range of from about 150° C. to about 30° C., that is, practically, at room temperature. Temperatures down to 5° C. and up to about 50° C. and tolerable. The temperature increase due to the passage of electric current is a very slight only, so that no purposely designed cooling system is necessary. The convenient pressure value is atmospheric. No isolation of the electrolyte from the atmospheric air is necessary; however, as in other similar processes, a closed environment is recommendable to avoid propagation of phenolic smell.

The coatings obtained according to this invention are practically insoluble (even in solvents such as dimethylformamide and dimethylsulfoxide). The IR-spectrum of the polymeric material is typical of polyoxyphenylenes, with a broadened absorption in the region of 3500-3000 cm$^{-1}$ attributable to hydroxyl groups and amino groups. The presence of appreciable proportions of amine in the coatings is confirmed by elemental analysis (nitrogen content generally varying from about 2.5% to about 5.5% by weight). It is not believed that the diamine used in the process may form segments in the polymer chains. However, as a matter of fact, all attempts of extracting the diamine from the polymer resulted unsuccessful.

From the physical point of view, the coatings are extremely hydrorepellent and, therefore, may easily be rinsed with water and dried in oven. Once dried, the surface of the coatings has a homogeneous aspect and a good gloss. The color varies from green-yellow to dark-yellow or reddish, depending upon the composition of the electrolyte and thickness of the coating. The adhesion to the substrate is excellent in most cases and generally good in others. Flexibility (ASTM D 522) is satisfactory and the hardness is high. Corrosion resistance tests in saline mist (ASTM D 117—without scratch) evidenced appearance of first traces of corrosion after not less than 150 hours.

The appended drawing schematically shows an experimental cell used in the Examples described hereinafter.

The cell comprises a vertical cylindrical vessel 1 of glass, closed by a cap 2 having an upwardly extending, flat tubular appendix 3 which serves as a guide for introduction of a metal strip 4 to be coated. The dimensions of the strip are 23.5×2.5×0.05 cm; in operation, the upper end of the strip is connected to the positive terminal of a D.C. source. A platinum spiral 5 affixed to the inner surface of the cylindrical wall of the vessel 1 serves as cathode. The inner diameter of the vessel is about 4 cm and a volume of 100 ml electrolyte is used each time. Under these conditions, the cell constant is about 15.

EXAMPLE 1

The cell described above was loaded with 100 ml of aqueous solution containing 15 g phenol, 2.5 g o-chlorophenol, 5 ml ethylenediamine, 15 ml methanol and 2.7 ml "Cellosolve". Six steel strips were preliminarily weighed and then coated in succession during increasing times, with D.C. voltage of 4 V applied to the cell. The current density was always fairly below 10 mA/sq.cm. and was uniformly decreasing as the coating process proceeded. A yellow-brownish uniform adherent coating was obtained on each strip, which was washed with water and dried in oven at 100° C. during 10 minutes, whereupon the weight of the coating was determined and referred to 1 sq.cm. surface. The results are tabulated below.

TABLE 1

| Strip No.: | Electrolysis time (minutes) | Amount coating (mg/sq.cm.) |
|---|---|---|
| 1 | 7 | 0.50 |
| 2 | 10 | 0.85 |
| 3 | 15 | 1.20 |
| 4 | 20 | 1.4 |
| 5 | 26 | 1.8 |
| 6 | 35 | 2.2 |

The thickness of the coatings was measured by a magnetic gage supplied by AMINCO and was about 5 microns on the strip No. 1 and about 20 microns on the strip No. 6. The coating films were strongly adherent, hydrorepellent, of high mechanical and electrical resistance, and practically insoluble in organic solvents. Corrosion resistance of strips No. 5 and No. 6 was in excess of 150 hours. The efficiency of the process was from 2 to 2.5 Faradays per mole deposited phenol.

EXAMPLE 2

A series of strips of soft iron was treated in the manner described in Example 1 with the use of 100 ml aqueous electrolyte containing 9.5 g phenol, 1.9 g o-cresol, 9.5 ml ethylenediamine, 19 ml methanol and 2.5 ml "Cellosolve". A constant D.C. voltage of 3 V was maintained during the tests. The anodic current density was well below 10 mA/sq.cm. and was uniformly decreasing with time. The results are tabulated below.

TABLE 2

| Strip No.: | Electrolysis time (minutes) | Amount coating (mg/sq.cm) |
|---|---|---|
| 1 | 8 | 0.55 |
| 2 | 10 | 0.75 |
| 3 | 15 | 0.90 |
| 4 | 20 | 1.2 |
| 5 | 26 | 1.45 |
| 6 | 30 | 1.60 |
| 7 | 35 | 1.80 |
| 8 | 45 | 2.45 |
| 9 | 100 | 3.20 |

The coating film thickness was 5 microns on strip No. 1 and 30 microns on strip No. 9.

EXAMPLE 3

A series of strips of soft iron was treated in the manner described in Example 1 with the use of 100 ml aqueous Electrolyte containing 10 g phenol, 2 g 3,5-dimethyl-phenol, 5 ml ethylenediamine, 20 ml methanol and 2.7 ml "Cellosolve". A constant D.C. voltage of 3 V was maintained during the tests. The current density was below 10 mA/sq.cm. and was uniformly decreasing during each run. The results are tabulated below.

TABLE 3

| Strip No.: | Electrolysis time (Minutes) | Amount coating (mg/sq.cm) |
|---|---|---|
| 1 | 10 | 0.68 |
| 2 | 15 | 1.50 |
| 3 | 20 | 1.60 |
| 4 | 30 | 2.28 |
| 5 | 45 | 3.00 |

The coating film thickness was about 6 microns on strip No. 1 and about 28 microns on strip No. 5.

EXAMPLE 4

Part 1

Steel strips were treated in the cell shown on the drawing with the use of 100 ml aqueous electrolyte containing 10 g phenol, 2.1 g o-chlorophenol, 1.0 g NaOH, 20 ml methanol and 2.7 ml "Cellosolve". The pH value of this electrolyte was 10.5. Each strip was treated under a constant voltage, varying from 2.5 V for the first strip to 10 V for the last strip. The current density was fairly below 10 mA/sq.cm. A rapid passivation occured in each case and the maximum amount coating was below 0.1 mg/sq.cm. even with a prolonged treatment. Actually, the presence of the coating was evidenced by its hydrorepellency, as both the amount and thickness were below measurable limits.

Part 2

At this point, a constant voltage of 3 V was applied to the cell, and a series of strips was treated at increasing additions of ethylenediamine to the electrolyte in the cell. The results were as follows.

TABLE 4

| ml Ethylenediamine present in the electrolyte | Amount coating (mg/sq/cm) |
|---|---|
| 0.0 | <<0.1 |
| 1.5 | 1.28 |
| 2.5 | 1.56 |
| 3.0 | 1.76 |
| 5.0 | 1.88 |

Thus, even in the presence of NaOH in the electrolyte, a striking effect was obtained with the first addition (1.5 ml) of ethylenediamine, with which a coating thickness as great as 12 microns was obtained. When 5.0 ml ethylenediamine were present in the electrolyte, the coating thickness was about 17 micron. It may also be significant that with the additions of the diamine the pH value of the electrolyte remainded buffered at its original value 10.5.

EXAMPLE 5

The purpose of this Example is to show both the stability of an electrolyte according to this invention and the reproducibility of the results.

The cell was charged with 100 ml aqueous electrolyte containing 10 g phenol, 2.1 g o-chloro-phenol, 5 ml ethylenediamine, 23 ml methanol and 2.7 ml "Cellosolve". The pH value was 10.08.

This charge electrolyte was used to coat in succession 100 strips of steel under a constant voltage of 3 V. The electrolysis time was 30 minutes for each strip. The initial current density was about 5 mA/sq.cm.; the density uniformly decreased, during each 30 minutes run, to about 0.5–0.7 mA/sq.cm. The electric charge transfer was about 80 Coulombs per each strip.

The results are tabulated below.

TABLE 5

| Strip No.: | Amount coating (mg/sq.cm.) |
| --- | --- |
| 1 | 1.75 |
| 20 | 1.65 |
| 40 | 1.60 |
| 50 | 1.70 |
| 60 | 1.8 |
| 70 | 1.70 |
| 80 | 1.78 |
| 90 | 1.80 |
| 100 | 1.85 |

At the end of the experiment about 25% of the initial volume of the electrolyte was exhausted and a total of about 3.5 g solid material was deposited on the strips. Notwithstanding that a total of about 8,000 Coulombs was transferred through the electrolyte, the pH value remained practically unchanged at 10.10 and the electrolyte was still usable for further coating runs until completely exhausted.

We claim:

1. A method for electrochemically coating a metallic substrate utilized as anode in an electrochemical cell in which a direct current flow of electrical energy is passed from a cathode to said anode through a liquid alkaline-reacting electrolyte comprising at least one phenolic monomer and a basic substance dissolved in a normally liquid solvent, thereby to progressively form on said substrate an impervious adherent polymeric film of a phenolic resin, wherein the improvement comprises:
   (a) the solvent is water, an alcohol having from 1 to 4 carbon atoms, or a mixture of the two;
   (b) the phenolic monomer comprises phenol in an amount of from 50 to 250 g per liter electrolyte, and at least one halo-, alkoxy- or alkyl-substituted phenol in an overall amount of from 5 to 35 g per liter electrolyte, the substituent being in an ortho- or meta- position;
   (c) the basic substance comprises an alkylene diamine in an amount of from 1 to 10 vol.% referred to the electrolyte;
   (d) the direct current flow density does not exceed 10 mA/sq.cm. of the metallic substrate.

2. A method according to claim 1, wherein the alkylene diamine is ethylene diamine or N,N'-bis-(2-hydroxyethyl)-ethylene diamine.

3. A method according to claim 1, wherein the halo-substituted phenol is o- or m-chlorophenol.

4. A method according to claim 1, wherein the alcohol is methanol.

5. A method according to claim 1, wherein the electrolyte also contains from 0.5 to 5 vol.% of "Cellosolve".

6. A method according to any claims 1 to 5, wherein the basic substance also comprises up to about 10 g NaOH per liter electrolyte.

7. A method according to claim 1, wherein the applied direct current voltage is from 2.5 V to 10 V.

8. A method according to claim 7, wherein the voltage is maintained constant during the coating process.

9. A method for electrochemically coating a metallic substrate as in claim 1, wherein the basic substance comprises an N,N'-bis-(hydroxyalkyl)-alkylene diamine.

* * * * *